United States Patent [19]
Pansky et al.

[11] 3,857,611
[45] Dec. 31, 1974

[54] WHEEL AND ALIGNMENT ASSEMBLY

[75] Inventors: Emil J. Pansky, Hillsborough; Donald G. Dean, Lafayette, both of Calif.

[73] Assignee: Whittaker Corporation, Los Angeles, Calif.

[22] Filed: Sept. 24, 1973

[21] Appl. No.: 400,053

Related U.S. Application Data

[62] Division of Ser. No. 4,557, Jan. 20, 1970, Pat. No. 3,779,610.

[52] U.S. Cl............................ 301/9 DN, 301/9 AN
[51] Int. Cl............................................... B60b 3/16
[58] Field of Search................ 301/9 DN, 65, 9 AN

[56] References Cited
UNITED STATES PATENTS

| | | | |
|---|---|---|---|
| 3,329,468 | 4/1967 | Beith | 301/9 DN |
| 3,428,365 | 2/1969 | French | 301/9 DN |
| 3,459,455 | 8/1969 | Muench | 301/9 DN |
| 3,649,079 | 3/1972 | English | 301/9 DN |
| 3,749,450 | 7/1973 | Senter | 301/9 DN |
| 3,759,576 | 9/1973 | Richter | 301/9 DN |

*Primary Examiner*—Lloyd L. King
*Assistant Examiner*—Reinhard J. Eisenzopf
*Attorney, Agent, or Firm*—Jay H. Quartz; Donald E. Nist

[57] ABSTRACT

A wheel construction with oversized stud apertures which in cooperation with selected alignment inserts define stud holes coincident in axial alignment with threaded studs on a particular vehicle axle flange. Inserts of differing configuration or of reversible orientation being interchangeably insertable in stud apertures to accommodate the wheel on a plurality of varying axle flanges having threaded studs symmetrically arranged on differing circular radii. Alignment inserts being freely slidable in the stud apertures and retained therein by large flat washers such that lug nuts threadable on the studs and against the washers secure the wheel to the particular vehicle axle flange.

5 Claims, 16 Drawing Figures

PATENTED DEC 31 1974 3,857,611

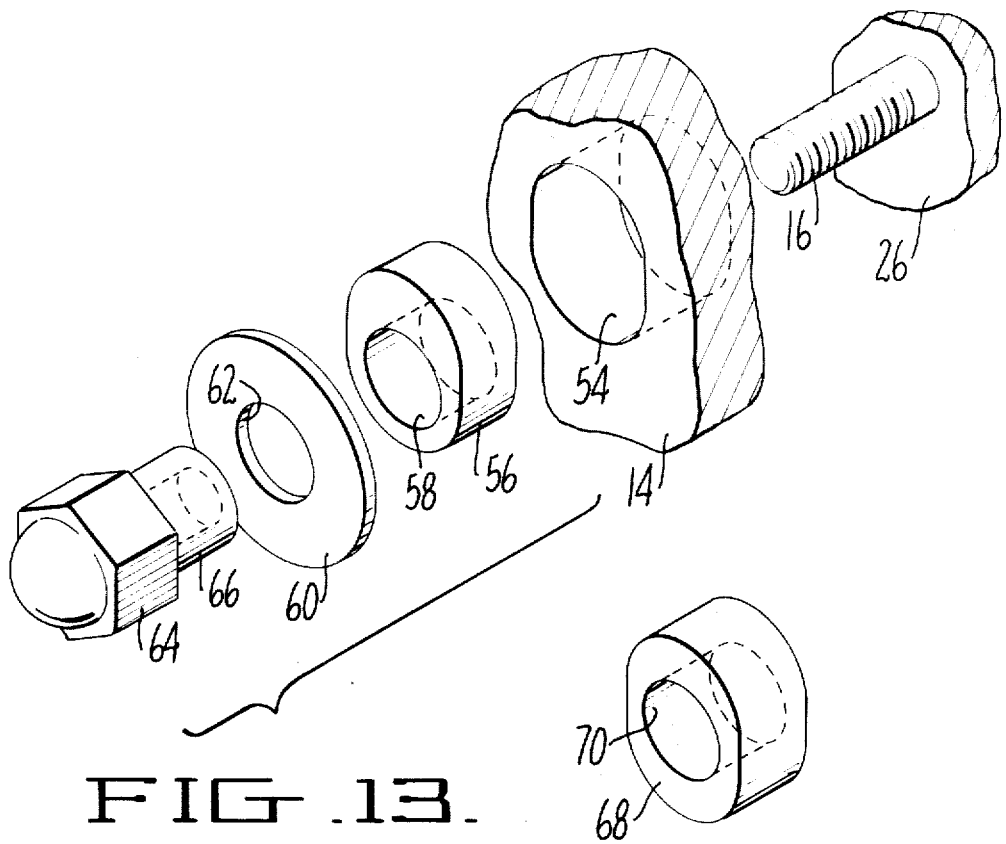
FIG.13.
FIG.14.
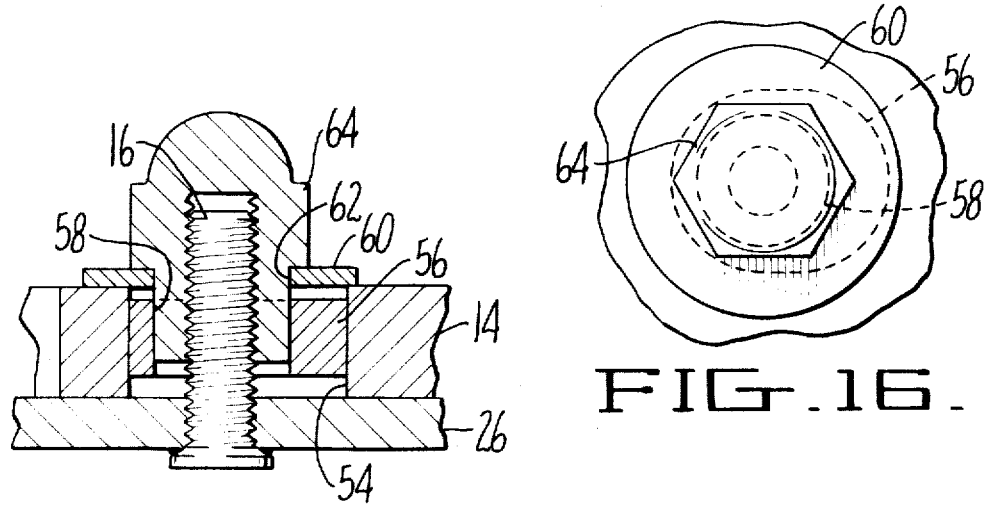
FIG.15.
FIG.16.

WHEEL AND ALIGNMENT ASSEMBLY

This is a division of application Ser. No. 4557, filed Jan. 20, 1970, now U.S. Pat. No. 3,779,610, issued Dec. 18, 1973.

BACKGROUND AND SUMMARY OF THE INVENTION

The use of specialty, dress or racing-type wheels on conventional or customized automobiles has increased in popularity in recent years. Cast aluminum or magnesium wheels are popular replacements for a manufacturer's standard steel pressed wheels to provide a dress or racing effect. The fabrication expense of the specialty wheels makes it impractical to cast the various wheel models necessary to fit each of the differing stud arrangements appearing on the many standard auto models currently manufactured.

In almost all instances the stud arrangements fall into three distinct categories. In these categories all are symmetrical five stud arrangements on bolt circles having either a 4½, 4¾, or 5-inch diameter.

It is therefore, the principal object of this invention to provide a wheel casting that can easily be accomodated on at least the three basic categories of stud arrangements.

Although devices have heretofore been developed to adapt cast wheels to a series of differing stud arrangements by the use of alignment inserts and specially designed wheel hub apertures such devices have not provided the most efficient methods consistent with existing casting techniques.

The instant invention provides an improved means for adapting a single wheel model that is easily fabricated and finished to cooperate with interchangeable inserts for accommodation on a plurality of differing stud arrangements on a vehicle axle flange.

BRIEF DESCRIPTION OF THE DRAWINGS

FIG. 13 is an exploded view of a third alignment assembly and a portion of an additional modified cast wheel.

FIG. 14 is a perspective view of an alignment insert of the third alignment assembly.

FIG. 15 is a sectional view of the third alignment assembly.

FIG. 16 is an end view of the third alignment assembly.

DESCRIPTION OF THE PREFERRED EMBODIMENTS

Figure 1:
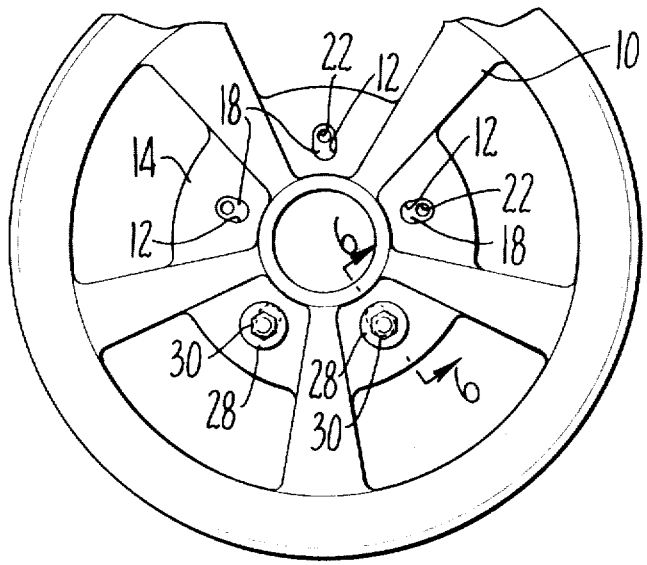
FIG. 1 is a view of a cast wheel and a first embodiment of an alignment assembly for mounting the wheel on a first stud arrangement.

FIGS. 1 through 6 illustrate a first embodiment of an alignment assembly for the cast wheel 10 shown in FIG. 1. The wheel is cast with a plurality of oversized, oblong stud apertures 12 symmetrically arranged on the center hub 14 of the wheel to accomodate studs 16 arranged on differing circular radii for the different vehicle models currently manufactured. As shown in FIG. 1 the wheel is cast for a five stud arrangement with stud apertures dimensioned to accommodate the three principal categories of varying diameter bolt circles of 4½, 4¾ and 5 inches, respectively.

Figure 4:
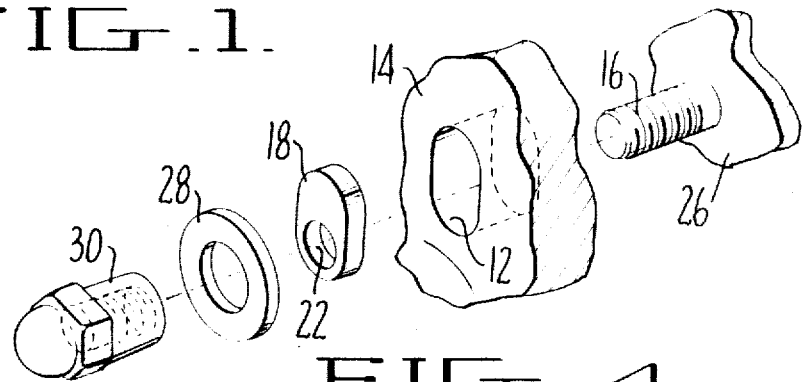
FIG. 4 is an exploded view of the alignment assembly.
Figure 6:
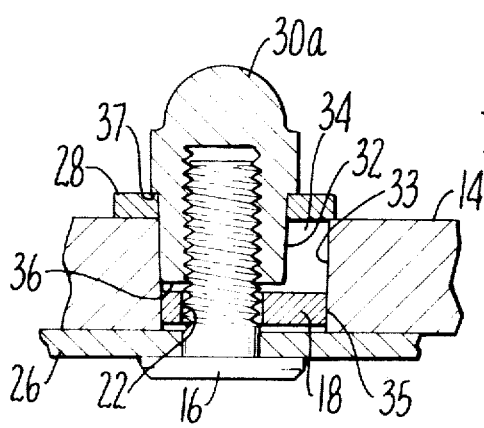
FIG. 6 is a sectional view taken on the lines 6—6 in FIG. 1.
Figure 7:
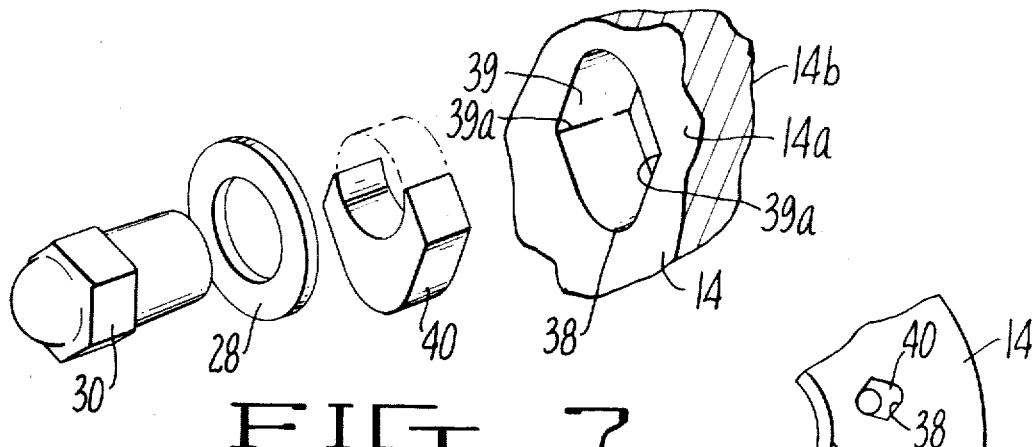
FIG. 7 is an exploded view of a second alignment assembly and a portion of a modified cast wheel.

The oblong stud apertures 12, as shown in FIGS. 4 and 6, are smooth walled and pass fully through the wheel hub 14, a feature which facilitates fabrication, allowing the holes to be easily formed either during casting or subsequently by drilling and milling.

Figure 2:
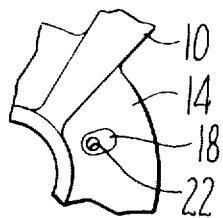
FIG. 2 is a view of a portion of the wheel of FIG. 1 and an alignment assembly for mounting the wheel to a second stud arrangement.
Figure 3:
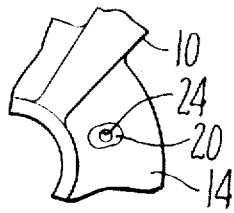
FIG. 3 is a view of a portion of the wheel of FIG. 1 and an alignment assembly for mounting the wheel to a third stud arrangement.
Figure 5:
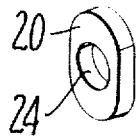
FIG. 5 is a perspective view of an alignment insert.

Freely insertable in the stud apertures 12 are elongated alignment inserts which are of two interchangeable types to accommodate the three stud arrangements described: an off-center alignment insert 18, shown in FIGS. 1, 2, 4 and 6; and an on-center alignment insert 20 shown in FIGS. 3 and 5.

The off-center insert 18 is formed with a circular stud hole 22 located on the longitudinal axis and adjacent one end of the elongated insert. The off-center insert 18 when installed in the stud apertures 12, as shown in FIG. 1, will adapt the wheel 10 to accomodate a stud in the largest diameter bolt circle or, upon reversing its orientation in the stud apertures, as shown in FIG. 2, to accomodate a stud in the smallest diameter bolt circle. In this manner the off-center insert cooperates with the stud aperture to define a circular stud hole adjacent either radial extemity of the oblong stud aperture.

Similarly, the on-center insert 20 is formed with a stud hole 24 midway on the longitudinal axis of the insert 20. When installed in the stud apertures the on-center inserts adapt the wheel to the median diameter bolt circle as exemplified in FIG. 3.

Considering FIG. 4 in greater detail, the threaded stud 16 is shown protruding from a portion of an axle flange 26. The threaded stud 16 is extendable through the wheel hub 14 and aligned in the stud aperture 12 by the alignment insert, in this instance the off-center insert 18. The alignment insert is slidably received in the stud aperture over the stud. The alignment inserts are retained in the stud aperture by the axle flange and by a large, flat retainer washer 28. A lug nut 30 is threaded on the stud, the shoulder 37 of the nut forcing the washer against the wheel hub and securing the wheel to the axle flange.

Referring to FIG. 6, lug nuts may be of the taper-lock type with an extruded, slightly tapered neck 32. The tapered neck of the modified lug nut 30a cooperates with slightly tapered walls 33 in a modified stud aperture 34 to eliminate all slack through designed interference. The peripheral sides 35 of the alignment insert may also be tapered for improved fit.

As is apparent in FIG. 6 the alignment insert 18 cooperates with the threaded stud 16 to align the wheel against the axle flange 26. The insert 18, therefore, is positioned in the stud aperture 12 between the axle flange and the end 38 of the lug nut. This feature is also peculiar to the first embodiment described above.

FIGS. 7 through 12 illustrate a second embodiment of an alignment assembly for a modified cast wheel similar to that shown in FIG. 1. A stud aperture 38 is again formed in the wheel hub 14 and is of sufficient size to accommodate the three basic stud arrangements heretofore described. The particular aperture 38 of the second embodiment is formed with slightly tapering walls 39, FIG. 12, forming an orifice of greater dimensions at the face 14a of the wheel hub than at the back 14b of the hub. The combined angular and curved configuration of the stud aperture 38 in FIG. 7 allows use of the smallest alignment insert practicable.

Figure 9:
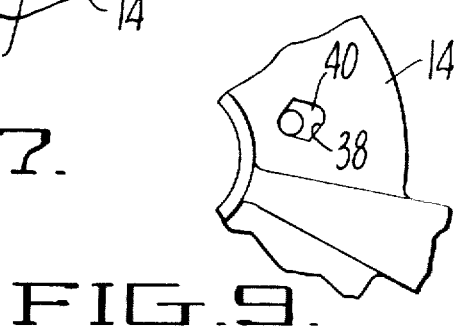
FIG. 9 is a view of the second alignment assembly for mounting the wheel on a second stud arrangement.
Figure 8:
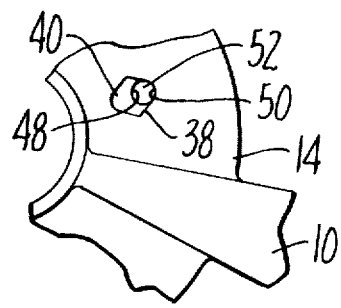
FIG. 8 is a view of the second alignment assembly for mounting the wheel on a first stud arrangement.
Figure 10:
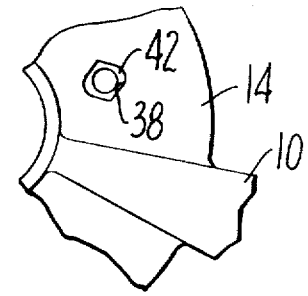
FIG. 10 is a view of the second alignment assembly for mounting the wheel on a third stud arrangement.
Figure 12:
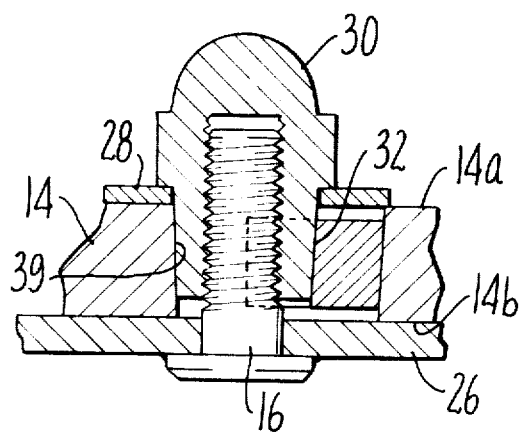
FIG. 12 is a sectional view of the second alignment assembly.
Figure 11:
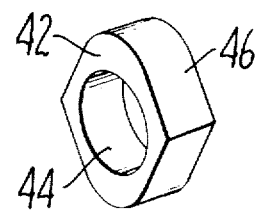
FIG. 11 is a perspective view of an alignment insert of the second alignment assembly.

Again, the alignment insert is of two types or configurations, an asymmetric off-center insert 40, as shown in FIGS. 7, 8, 9 and 12, and a symmetric on-center insert 42 as shown in FIGS. 10 and 11. The off-center insert 40, which is slidably inserted in the stud aperture, may be selectively oriented to accommodate the wheel on the largest bolt circle, as shown in FIG. 8, or, alternatively, to accommodate studs in the smallest bolt circle, as shown in FIG. 9. The on-center insert 42 is slidably inserted into the stud aperture 38 to accomodate studs in the median bolt circle as shown in FIG. 10. The opposed angular faces 39a of the tapered aperture wall aid in locating the inserts in the aperture by essentially keying the inserts to the aperture.

Unlike the first embodiment of the alignment assembly, the circular hole 44 in the on-center insert 42 in FIG. 11 engages not the threaded stud 16 on the axle flange 26, but rather the tapered neck 32 of the lug nut 30. The hole, 44, therefore, as well as the peripheral sides 46, of the on-center insert 42 must be provided with a slight taper to accommodate the tapered neck of the lug nut and to be accommmodated in the tapered stud aperture 38. The wedge effect of the lug nut against the insert, which is secondarily transferred to the wheel hub, firmly secures the wheel to the axle flange when the lug nut is threaded on the stud.

The asymmetric off-center insert 40, FIG. 8, is shaped in an angular crescent and is fabricated with a semi-circular concave end face 48 which in combination with the curved portion 50 of the stud aperture 38 is designed to form a tapered circular hole 52. The tapered neck 32 of the lug nut is interposed between the semicircular concave end face 48 of the insert 40 and the curved portion 50 of the stud aperture wedging the insert in the aperture.

As in the first embodiment, the lug aperture and alignment insert are covered by the flat retainer washer 28 through which the tapered neck 32 of the lug nut 30 is inserted when threaded on the stud 16. The wheel is thereby secured to the axle flange by the wedge action of the neck of the lug nut relative to the hub, and by the direct action of the shoulder 37 of the lug nut 30 against the washer.

FIGS. 13 through 16 illustrate a third embodiment of an alignment assembly for a cast wheel with symmetrically arranged stud apertures similar to the assembly shown in FIG. 1. The exploded view in FIG. 13 clearly shows the interrelation of the elements of the assembly. The threaded stud 16 protruding from the axle flange 26 is accommodated by the oversized stud aperture 54 in the wheel hub 14. An off-center alignment insert 56 having a circular hole 58 axially aligned with the stud is slidably received in the stud aperture 54 over the stud 16 when the wheel is placed against the axle flange 14. A flat retainer washer 60 is placeable over said studs and against said hub portion to confine said alignment inserts in said stud apertures. A lug nut 64 having an elongated cylindrical neck 66 is threaded on the stud 16. The neck of the lug nut extends through the center hole in the washer and through the circular hole in the off-center insert 56 securing the wheel to the axle flange.

In the FIGS. 13 – 16 embodiment neither lug nut, insert nor aperture are tapered. The wheel is secured solely by the direct action of the lug nut which forces the wheel against the axle flange.

As in the other embodiments, the off-center insert may be oriented to accommodate either the largest or smallest diameter bolt circles for which the alignment assembly is designed. To provide for the median bolt circle an interchangeable on-center alignment insert 68 is provided with a centered circular hole 70 as shown in FIG. 14.

In FIGS. 15 and 16 the lug nut 64 is shown securing the wheel hub 14 to the axle flange 26. When threaded on the stud 16, the shoulder 70 of the lug nut 64 forces the washer 60 against the hub, clamping the wheel to the axle flange. As is apparent in FIG. 16, the washer is of sufficient diameter to completely cover the lug aperture when an off-center insert is utilized, providing a pleasing appearance to the wheel when mounted.

We claim:

1. A wheel having adapter means to selectively adapt said wheel to axle flanges having threaded studs of differing concentric arrangements, said means comprising a center hub portion of the wheel formed with a plurality of smooth-walled, oversized stud apertures contoured to accommodate threaded axle-flange studs arranged on a defined plurality of differing circular radii and formed to have substantially uniform internal dimensions throughout their axial length, interchangeable alignment inserts of multiple configuration and orientation contoured to be slidably received in said stud apertures to selectively define circular stud holes coincident with each of the defined plurality of stud arrangements and formed to have substantially uniform external dimensions throughout their axial length, flat retainer washers which are placeable over said studs and against said hub portion to confine said alignment inserts in said stud apertures, said washers covering, at least in substantial part, said stud apertures, and lug nuts having an elongated neck portion threadable on said studs and against said washers to secure said wheel to said axle flange, said alignment inserts having two configurations: an off-center insert having an asymmetrically located stud hole to make each said insert reversible in orientation in said stud apertures to alternatively accommodate threaded studs arranged on the largest circular radii and studs arranged on the smallest circular radii; and an on-center insert having a centered circular stud hole to accommodate a median diameter stud bolt circle, said circular stud holes of said alignment inserts being sized to receive said neck portion of said lug nuts which extends through said retainer washers and into the alignment inserts when said lug nuts are threaded on said studs.

2. The adapter means of claim 1 wherein said stud apertures are formed with two angular side walls and two curved end walls; wherein each said off-center insert has two angular side walls, a curved convex end wall, and a semi-circular, concave end face, said off-center inserts being reversible in orientation in said stud apertures to selectively define stud holes of substantially uniform dimensions throughout their axial length which alternatively accommodate threaded studs arranged on said largest and smallest circular radii; and wherein each said on-center insert has two angular side walls and two curved end walls for slidable mating with said walls of said stud apertures and has a centered circular stud hole of substantially uniform internal dimensions throughout its axial length to accommodate studs on said median diameter circle.

3. A wheel having adapter means to selectively adapt said wheel to axle flanges having threaded studs of differing concentric arrangements, said means comprising a center hub portion of the wheel formed with a plurality of smooth-walled, oversized stud apertures contoured to accommodate threaded axle-flange studs arranged on a defined plurality of differing circular radii, interchangeable alignment inserts of multiple configuration and orientation contoured to be slidably received in said stud apertures, flat retainer washers which are placeable over said studs and against said hub portion to confine said alignment inserts in said stud apertures, said washers covering, at least in substantial part, said stud apertures, and lug nuts having elongated tapered neck portions threadable on said studs and against said washers to secure said wheel to said axle flange, said stud apertures having smooth, slightly tapered walls along their axial length which cooperate with alignment inserts having smooth, slightly tapered sides along their axial length to securely locate said inserts in said apertures, said stud apertures and said alignment inserts cooperating to selectively define circular tapered stud holes coincident with each of the defined plurality of stud arrangements into which said tapered neck portions of said lug nuts are slidably extendable when said lug nuts are threaded on said studs.

4. The adapter means of claim 3 wherein said stud apertures are formed with two angular side walls and two curved end walls, and said alignment inserts are of two configurations: an asymmetric off-center insert having two angular side walls, a curved convex end wall and a semi-circular, concave end face, said off-center inserts being reversible in orientation in said stud apertures to selectively define tapered stud holes which alternatively accommodate threaded studs arranged on the largest circular radii and studs arranged on the smallest circular radii, and a symmetric on-center insert, having two angular side walls and two curved end walls, said on-center inserts having a centered tapered circular stud hole to accommodate the median diameter bolt circle.

5. The adapter means of claim 3 wherein each said alignment insert defines a tapered hole extending therethrough for slidably receiving said tapered neck portions of said lug nuts.

* * * * *